UNITED STATES PATENT OFFICE.

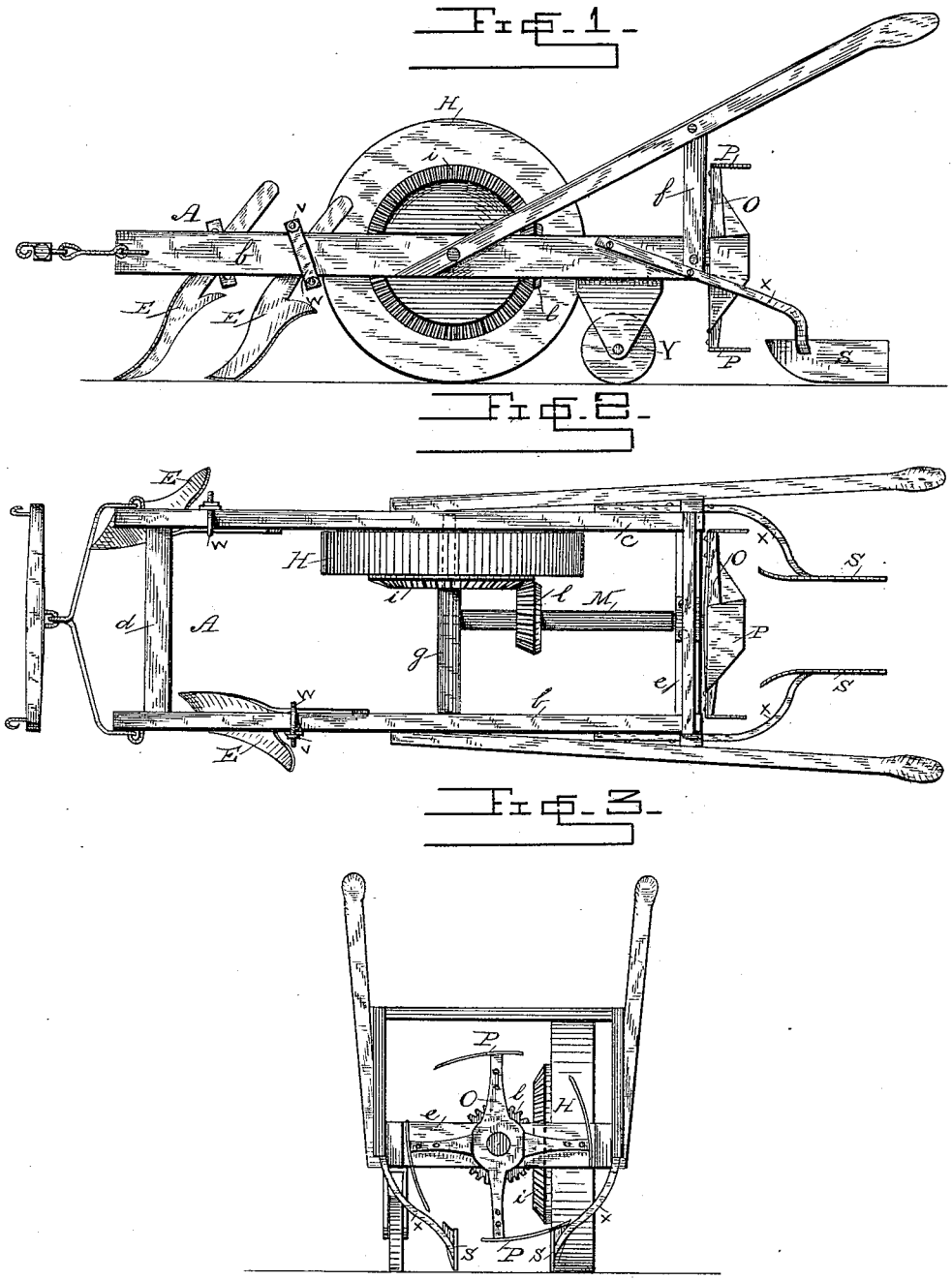

BARRETT LIEBER JONES, OF CALHOUN'S MILLS, SOUTH CAROLINA.

COMBINED COTTON CHOPPER AND CULTIVATOR.

SPECIFICATION forming part of Letters Patent No. 365,007, dated June 14, 1887.

Application filed June 10, 1886. Serial No. 204,718. (No model.)

*To all whom it may concern:*

Be it known that I, BARRETT LIEBER JONES, a citizen of the United States, residing at Calhoun's Mills, in the county of Abbeville and State of South Carolina, have invented certain new and useful Improvements in Combined Cotton Chopper and Cultivator; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a machine for cultivating and chopping out cotton; and it consists of certain improvements in the construction of such a machine for the purpose of rendering the same more simple and efficient.

It is illustrated in the accompanying drawings, in which—

Figure 1 is a side view in elevation; Fig. 2, a plan, and Fig. 3 a rear end elevation.

The frame A is composed of two side pieces, *b c*, two end pieces, *d e*, and a central beam, *g*. The handles of the machine are attached to the side pieces and to a frame, *f*, rising from the side pieces.

E are removable and adjustable plows, provided with arms secured to the inner sides of the side pieces by means of clips and screw-bolts *v w*. These plows loosen, mellow, and ridge up the ground on both sides of the row in advance of the chopping-hoes.

A single driving-wheel, H, is employed, which is located against one of the side pieces, *c*, and turns on an axle extending from said piece to the central beam, *g*. The inner face of the drive-wheel is provided with a series of teeth or cogs, *i*, which engage with a pinion, *l*, on a longitudinal shaft, M. The shaft M has its bearings in central beam, *g*, and rear cross-piece, *e*. A continuous rotary motion is imparted to shaft M by the driving-wheel H through the cogs *i* and pinion *l*.

O is a spider secured to the end of shaft M back of the rear cross-piece, *e*.

P are hoes secured to the spokes of the spider by means of plates *p* and set-screws. These hoes are set to cut out the superfluous cotton-plants at regular intervals as the shaft on which they are carried rotates, and are separately removable and adjustable. If a hoe should be broken, the plates may be removed and a new hoe substituted. They are constructed, substantially as shown, with a sharp point, whereby they enter the earth and cut through obstructions with greater ease and with less danger of being broken than when square-shaped or of other forms.

S S are a set of shovel-plows or scrapers, attached, respectively, to the side pieces, *b c*, of the frame directly back of the hoes by means of bent arms *x*, the purpose of which is to throw the earth up against the plants after the chopping has been done and into the spaces cleared by the chopping-hoes.

Y is a small wheel hung on the side *b* of the frame, and serves to aid in guiding the machine and regulating the depth of the plows.

Having thus described my invention, what I claim is—

In a cotton chopper and cultivator, in combination with the frame having a central piece, *g*, the single driving-wheel H, located at one side of the frame and having a bearing in said piece *g*, the rotating shaft and pinion engaging with the driving-wheel, mounted at one end in central piece, *g*, and at the other end on rear cross-piece of the frame, the spider secured to said shaft and provided with the hoes P, and the small wheel Y on the side of the frame opposite to large driving-wheel for regulating the depth of the hoes, substantially as described.

In testimony whereof I affix my signature in presence of two witnesses.

BARRETT LIEBER JONES.

Witnesses:
J. M. WHITE,
J. W. JONES.